United States Patent [19]

Junemann et al.

[11] Patent Number: 4,770,582
[45] Date of Patent: Sep. 13, 1988

[54] PRESS-TYPE FASTENER FOR THREADED PINS

[75] Inventors: Dietrich Junemann, Lorrach; Werner Wolpensinger, Rheinfelden, both of Fed. Rep. of Germany

[73] Assignee: A. Raymond, Lorrach, Fed. Rep. of Germany

[21] Appl. No.: 922,784

[22] Filed: Oct. 23, 1986

Related U.S. Application Data

[63] Continuation of Ser. No. 704,425, Feb. 22, 1985, abandoned.

[30] Foreign Application Priority Data

Feb. 25, 1984 [DE] Fed. Rep. of Germany ....... 3406934

[51] Int. Cl.$^4$ ............................................. F16B 37/14
[52] U.S. Cl. .................................. 411/182; 411/437; 411/508; 411/913
[58] Field of Search ............... 411/371, 372, 373, 374, 411/436, 437, 508, 509, 510, 511, 512, 913, 182; 24/90 E, 108; 248/74.3

[56] References Cited

U.S. PATENT DOCUMENTS

| | | | |
|---|---|---|---|
| 2,819,642 | 1/1958 | Refrigeri | 411/373 |
| 3,241,427 | 3/1966 | Bosler | 411/374 X |
| 3,545,708 | 12/1970 | Gross | 411/437 X |
| 3,601,823 | 8/1971 | Isaacs | 411/374 X |
| 3,701,373 | 10/1972 | Wronke | 411/182 |
| 3,736,834 | 6/1973 | McDonald | 411/913 X |
| 4,055,929 | 11/1977 | Stancati et al. | 411/437 X |
| 4,082,030 | 4/1978 | Erickson | 411/913 X |
| 4,175,605 | 11/1979 | Johnson | 411/436 X |
| 4,299,520 | 11/1981 | Iwata | 411/437 |
| 4,435,111 | 3/1984 | Mizusawa | 411/437 |
| 4,518,297 | 5/1985 | Krans | 411/908 X |
| 4,600,344 | 7/1986 | Sutenbach et al. | 411/437 X |

FOREIGN PATENT DOCUMENTS

| | | | |
|---|---|---|---|
| 283799 | 10/1966 | Australia | 411/508 |
| 862436 | 2/1971 | Canada | 411/437 |
| 2018390 | 10/1971 | Fed. Rep. of Germany | 411/437 |
| 2929461 | 1/1981 | Fed. Rep. of Germany | 411/437 |
| 3000208 | 5/1982 | Fed. Rep. of Germany | |
| 2520457 | 7/1983 | France | 411/508 |
| 489928 | 4/1970 | Switzerland | 248/74.3 |
| 1556241 | 4/1980 | United Kingdom | |

Primary Examiner—Gary L. Smith
Assistant Examiner—Rodney M. Lindsey
Attorney, Agent, or Firm—Finnegan, Henderson, Farabow, Garrett & Dunner

[57] ABSTRACT

A fastener made of a resilient material to be pressed onto a threaded pin or the like comprising a holding part for holding an object and a fastening part for securing the fastener to the pin, the fastening part including a plurality of clamping walls integral with and extending downwardly from the holding part of the fastener for tightly gripping the periphery of the pin, the walls having a smooth inner surface and being uniformily distributed in a circle around the longitudinal axis of the fastener to form an opening for the pin, and a rib integral with the holding part and projecting radially outwardly from each longitudinal edge of each wall with the adjacent ribs of every two adjoining walls being connected to each other.

6 Claims, 1 Drawing Sheet

PRESS-TYPE FASTENER FOR THREADED PINS

This application is a continuation, of application Ser. No. 704,425, filed 2/22/85 now abandoned.

BACKGROUND OF THE INVENTION

This invention relates to a nut-like fastener made of plastic that can be pressed onto a threaded pin. The fastener consists of a holding part for holding another object in place, such as a panel or mat, and a fastening part for securing the fastener to the pin. The fastening part consists of several resilient clamping walls that are integral with and extend downwardly from the holding part of the fastener and which are uniformly distributed in a circle around the axis of the fastener and form an opening for the pin. The walls readily expand to permit the fastener to be pushed onto the pin, but then tightly grip the periphery of the pin to hold the fastener in place.

A fastener of this type and in the shape of a nut that can be pressed onto a threaded pin is known from German Pat. No. 30 00 208. This fastener can be used with other holding-type elements besides nuts, such as caps, cable clamps, tube clamps, cable harnesses or the like, the holding part of the fastener either being mounted on the fastening part or integral with it.

In this type of fastener, however, the clamping walls are integrally joined at their lower edges to the inside edge of the head of the nut in such a manner that upon the insertion of the threaded pin into the nut, the clamping walls elastically bend apart at their free upper ends. In this manner the nut can be easily hammered down onto the threaded pin and, where called for, may futhermore be rotated somewhat thereafter, with the threads slightly digging into the inside surface of the smooth clamping walls. This type of fastener offers the advantage of being rapidly and simply pressed on the threaded pin, which is usually mounted on a support plate, and if necessary, removed simply by being turned.

With the clamping walls joined at their lower edges, however, they only tend to grip the threaded pin at that end, permitting, within certain limits, the other or free end of the nut to tumble or wobble about the pin. This is generally not a problem in a driven nut like that shown in the German reference where its bottom flange rests firmly against the surface of the element to be fastened to the support plate. But if, on the other hand, it is desired to fasten an object to the holding part of the fastener remote from the plate holding the pin, then this tumbling motion could be a problem because the components to be held in place will not be held firmly enough.

SUMMARY OF THE INVENTION

It is therefore the object of the invention to provide a press-type fastener that retains the resiliency of the clamping walls so that the fastener can be easily pressed onto the threaded pin, but that makes the connection between the holding part and the clamping walls as stable as possible, so that the fastener will be firmly secured to the pin.

Additional objects and advantages of the invention will be set forth in the description which follows, or will be obvious from the description, or may be learned by practice of the invention.

To achieve these objects, the fastener of the present invention for holding an object to a threaded pin is made of resilient material and comprises a holding part for holding an object and a fastening part integrally connected to the holding part for securing the fastener to the pin, the fastening part comprising a plurality of clamping walls integral with and extending downwardly from the holding part of the fastener for tightly gripping the periphery of the pin, said walls having a smooth inner surface and being uniformily distributed in a circle around the longitudinal axis of the fastener to form an opening for the pin, and a rib integral with the holding part and projecting radially outward from each longitudinal edge of each clamping wall with the adjacent ribs of two adjoining walls being connected to each other.

BRIEF DESCRIPTION OF THE DRAWINGS

The drawings show several illustrative embodiments of the invention which are discussed in more detail below.

DETAILED DESCRIPTION OF THE INVENTION

Figure 1:
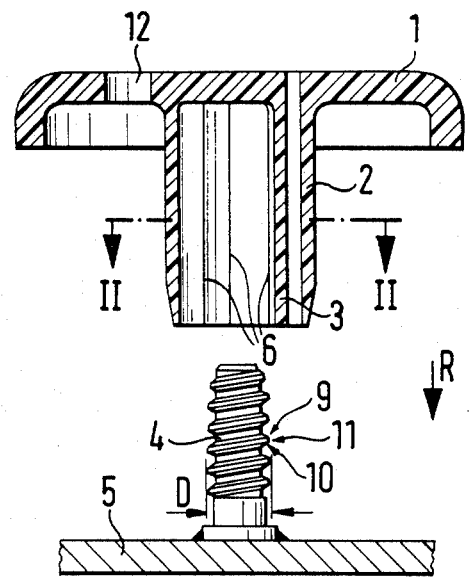
FIG. 1 is a longitudinal sectional of a fastener constructed according to the present invention through the holding part and the fastening part taken along the line I—I of FIG. 2.

The fastener of this invention is made of a hard yet resilient plastic material and with reference to the embodiment of FIG. 1 consists essentially of a holding part 1, illustratively shown as a round top disk, and a fastening part 2 integrally molded with the holding part. The fastening part has a plurality of smooth, arcuate-shaped clamping walls 3 uniformily distributed in a circle around its inner periphery to form an opening for the pin, the clamping walls, after being pressed onto a threaded pin 4, gripping tightly against the pin's threaded edges 11. Threaded pin 4 is typically welded, or suitably fastened in some other manner, to a support plate 5.

Figure 2:
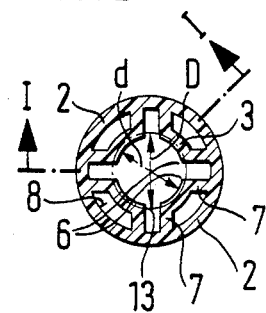
FIG. 2 is a sectional view of the fastening part of the fastener taken along the line II—II of FIG. 1.

The arcuate clamping walls are integral with and extend downwardly from the holding part 1 of the fastener and, as best shown in FIG. 2, are essentially free standing, being integrally connected only along their longitudinal edges 6 to an outer, circular wall S by a plurality of outwardly projecting radial ribs 7. In this embodiment, the clamping walls have an inner circular surface between the two ribs 7.

As a result of this design, the clamping walls are uniformly braced toward the outside along their entire length. Furthermore, because of their resiliency and the cooperation of the equally resilient ribs 7, the clamping walls will yield enough so that they can be easily pressed over the threaded pin.

Preferably, ribs 7 are arranged in such a manner that adjacent ribs connected to two adjoining clamping wall edges 6, which are axially parallel, are parallel to each other. As a result the threaded pin will exert a slight wedging effect on the particular adjoining ribs during the penetration of the pin and further bends them more or less apart, so that the smooth clamping walls simultaneously yield somewhat outwardly. This effect can be further enhanced by making the clamping walls between every two ribs flat or plane as shown in FIG. 3, whereby the clamping walls will be deformed into an arc by the outer threads only when being pressed onto the threaded pin.

As shown in FIG. 1, the threaded pin 4 typically has a saw-tooth cross-sectional thread 1 with the side or flank of the threads 9 extending in the direction shown by the arrow R being shallow and the flank 10 in the opposite direction being steep. Because of the shallow slope of the thread flanks 9, the clamping walls 3 of the fastener, when applied in the direction of the arrow "R", can easily slip over the thread edges 11 of threaded pin 4, the outer diameter "D" of the threads slightly exceeding the inside diameter "d" of the clamping walls 3. After the fastening part 2 is pressed onto the pin, the edges 11 of the threads will dig slightly into the sides of the clamping walls 3 to thereby secure the fastener element against travel in a direction opposite to "R". If it is desired to later remove the fastener, the top disk, which can be conveniently provided with two mutually opposite holes 12 (only one of which is shown) to be engaged by a suitable tool, can be easily rotated loose.

Thus by providing clamping walls that extend down from the holding part of the fastener and whose longitudinal edges are connected to outwardly extending radial ribs that are connected to each other by outer wall 8, the clamping walls can readily separate as the fastener is pressed down onto the pin permitting easy and rapid assembly, yet it assures a tight fit against removal of the fastener and a rigid or stable seating of fastener on the pin free of "tumbling". Moreover, even after the fastening part has been rotated loose, it can be used again.

Figure 3:
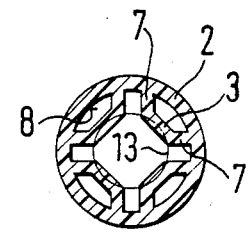
FIG. 3 is a sectional view similar to FIG. 2 and showing another design of the clamping walls.

FIG. 3 shows another design for the resilient clamping walls 3, whereby these clamping walls have an inner flat or plane surface between the two ribs 7. When the element is pressed onto the threaded pin 4, these clamping walls 3 are easily bent outwardly and can readily adapt in an arcuate manner to the outer diameter, shown by line 13, of the threaded pin 4. At the same time the parallel ribs 7 are somewhat bent apart, every two ribs forming an elastic unit with the clamping wall 3 between them.

Figure 4:
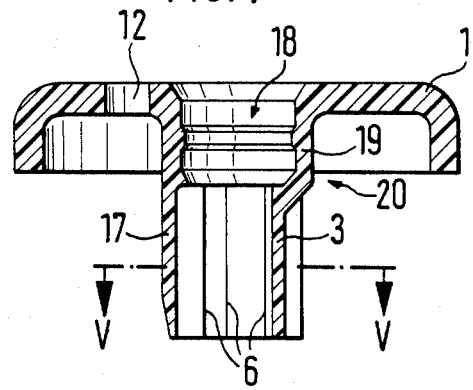
FIG. 4 is a longitudinal sectional view of another embodiment of a fastener taken along line IV-IV of FIG. 5.

FIG. 4 shows another fastener, again with a round top disk 1 housing a snap connection bushing 19 integral therewith and having an upwardly directed opening 18 into which a further element having a complimentary snap-in pin can be pressed into place; for example, to fix a carpet over an insulating mat on the floor of a motor vehicle. The fastening part of the fastener, including the clamping walls 3 for receiving a threaded pin 4, is located beneath the bushing 19. As shown by the cross-sectional view in FIG. 5, this embodiment also includes outwardly projecting radial ribs 7 along the axially parallel edges 6 of the clamping walls 3, but here the continuous outer wall of the fastening part 2 is absent. Instead, adjacent ribs 7 are mutually joined at their outer rib edges 16 by a connecting wall 17 that spans the gap between them and is coaxial with the clamping walls 3, whereby the ribs 7, together with the connecting wall 17 form a U-shape in cross-section. This embodiment is more resilient than the previous embodiments and also is easier to manufacture by ejection molding because of the elimination of the continuous outer wall 8 which, in turn, eliminates the presence of internal cores between the wall 8 and clamping walls 3 as shown in FIGS. 2 and 3.

Figure 5:
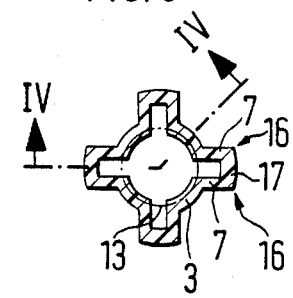
FIG. 5 is a sectional view of the fastening part taken along the line V—V of FIG. 4.

It should also be understood that ribs 7 can extend radially outward and parallel to each other as shown in FIG. 5 or they could converge outwardly forming an acute angle between them. The same design could be employed in the embodiments of FIGS. 2 and 3. In these instances, the already mentioned wedging effect by the threaded pin 4 on the ribs 7 would be further enhanced.

Furthermore, it is possible to combine the embodiments of FIGS. 1, 2, 4 and 5 in such a manner that the fastening part of the fastener is constructed in its lower region according to FIG. 5 and in its upper region according to FIG. 2. As a result, the fastener would have to be driven with a somewhat greater force in the second stage of pressing than in the first, but the clamping walls 3 would press harder in this region against the threaded pin 4.

It should also be kept in mind that the design of the fastener of this invention is advantageous as regards its manufacture if the holding part is mold-ejected in the axial direction of the fastening part, whereby only two mold halves will be needed.

Moreover the invention is applicable not only for use with a threaded pin, but also for use with pins having radial projections or beads whose periphery is roughened in some manner. Such a pin design, however, will generally only be used where one does not require the fastener to be removed simply by turning it about the pin and reused. In that case, the fastener must be replaced by a new one after disassembly because the fastener would be essentially destroyed by the force needed to remove it.

It will be apparent to those skilled in the art that various modifications can be made to the fastener of this invention without departing from the scope or spirit of the invention and without sacrificing its chief advantages.

What is claimed is:

1. A fastener made of a resilient material to be pressed onto a threaded pin or the like comprising a holding part for holding an object and a fastening part integrally connected to the holding part for securing the fastener to the pin, the fastening part comprising a plurality of essentially free standing, arcuate-shaped clamping walls that are integral at one end with and extend downwardly from the holding part of the fastener and are free at their opposite end for tightly gripping the periphery of the pin, each clamping wall having a smooth inner surface and having two lontitudinal edges each being parallel to the longitudinal axis of the fastener, said clamping walls being spaced apart and uniformly distributed in a circle around the axis to form an opening for insertion of the pin from the side of the fastener remote from the holding part such that the diameter of the inner surface of the clamping walls is less than the outer diameter of the pin, a plurality of ribs each integral with the holding part and a longitudinal edge of a clamping wall and projecting radially outward from said longitudinal edge, each of said clamping walls being supported by two of said ribs and the adjacent ribs of two adjoining clamping walls being parallel to and spaced from each other and connected to each other radially outward from said longitudinal edges by an outer wall coaxial with said clamping walls and with the two ribs of each clamping wall being radially spaced apart from each other where they join the longitudinal edges of the that clamping wall to provide an arcuate-shaped opening behind each clamping wall and extending the full length of said clamping wall so that the full length of the clamping wall including its end at the pin-insertion opening is attached only to its integral ribs, whereby each clamping wall and its integral ribs form a resilient unit that bends outwardly as the fastener is pressed onto the pin but that tightly grips the threads on the pin to hold the fastener in place.

2. The fastener of claim 1, wherein the outer edges of the two ribs of each clamping wall are integrally connected to each other by a connecting wall spanning the gap between them, said connecting wall also being integral with and extending downwardly from the holding part of the fastener.

3. The fastener of claim 1, wherein the outer wall of the adjacent ribs of two adjoining walls is also integral with and extends downwardly from the holding part of the fastener.

4. The fastener of claim 1, wherein the inner surface of the clamping walls is circular.

5. The fastener of claim 1, wherein the inner surface of the clamping walls is flat.

6. The fastener of claim 1, wherein the clamping walls comprise four arcuate-shaped clamping walls uniformly distributed in a circle around the axis of the fastener.

* * * * *